United States Patent [19]

Klein et al.

[11] Patent Number: 4,884,870
[45] Date of Patent: Dec. 5, 1989

[54] LENS STRUCTURE FOR A VEHICLE RADIO OR THE LIKE

[75] Inventors: Frank H. Klein; Steven F. Selby; Sigmund Klueger, all of Huntsville, Ala.

[73] Assignee: Chrysler Motors Corporation, Highland Park, Mich.

[21] Appl. No.: 258,758

[22] Filed: Oct. 17, 1988

[51] Int. Cl.4 ............................................... G02B 7/02
[52] U.S. Cl. .................................... 350/319; 350/417
[58] Field of Search ............... 350/319, 417, 124, 321, 350/322; 65/36, 37, 39

[56] References Cited

U.S. PATENT DOCUMENTS

| | | | |
|---|---|---|---|
| 3,661,436 | 5/1972 | Horwath et al. | 350/322 |
| 4,065,283 | 12/1977 | Asahara et al. | 65/37 |
| 4,108,621 | 8/1978 | Asahara et al. | 350/319 |

Primary Examiner—Bruce Y. Arnold
Assistant Examiner—Loha Ben
Attorney, Agent, or Firm—Edward A. Craig

[57] ABSTRACT

A lens structure for a vehicle radio or the like to permit display of the information generated by the radio is provided. The lens structure has a transparent forward panel and an opaque rearward panel heat fused thereto. The lens portion of the forward panel is not covered by the rearward panel thus providing a viewing lens.

4 Claims, 1 Drawing Sheet

LENS STRUCTURE FOR A VEHICLE RADIO OR THE LIKE

BACKGROUND OF THE INVENTION

1. Field of the Invention

This invention relates to a lens structure for a vehicle radio or the like which includes a clear lens surrounded by an opaque field.

2. Description of the Prior Art

Lens structures of the type to which the present invention appertains are in common use for vehicle radios. The lens structure is a plate-like element and includes a clear lens portion surrounded by an opaque field. The lens portion is for the display of information generated by the radio. This information may include, for example, the station to which the radio is tuned, whether the radio is set for AM or FM, and the time of day.

In the past, such lens structures have been manufactured by first molding or otherwise preparing a clear plate of a scratch resistance glassy plastic material such as an acrylic resin. The rearward surface of this plate was then painted an opaque color, usually black, leaving a central clear lens area for the display of information.

This method of fabricating the lens structure has certain drawbacks. Firstly, the painted surface is easily scratched, thus necessitating very careful handling of the lens structure from the time it is painted to the time when it is installed. This results in costly procedures which are, however, not entirely effective, there being a relatively high scrap rate of such lens structures as a result of inadvertent scratching of the painted surface.

Additionally, it is difficult to properly paint such lens structures. In the painting process, a mask must be used to prevent painting the portion which is to remain clear. The mask gets paint on it and must be cleaned often to prevent making paint marks on the clear portion. Overall, this painting process also involves a relatively high scrap rate.

In accordance with the present invention, instead of painting the rear surface of the lens structure, a layer of opaque pigmented plastic material is heat molded onto the rear surface of the glassy panel (or the reverse process). A clear lens portion projects through this opaque layer forming the desired lens.

Such a lens structure offers the advantage of ready quality control, there being no liquid paint to contend with. Additionally, the opaque layer, being pigmented and relatively thick, is not subject to easy scratching thereby resulting in a lower scrap rate and less expensive handling procedures. A further advantage of this construction is that a cheaper plastic can be used for the opaque layer than is used for the clear glassy layer.

SUMMARY OF THE INVENTION

A lens structure for a vehicle radio or the like to permit display of information generated by the radio is provided. The lens structure comprises a forward panel molded of a clear thermoplastic resin. The forward panel includes a forward surface and a rearward surface. A lens portion is provided on the rearward surface projecting rearwardly therefrom. The lens portion forms, with the contiguous forward portion of the forward panel, a lens.

A rearward panel is molded of an opaque thermoplastic resin and is heat fused to the portion of the rearward surface of the forward panel adjacent to, but not including, the lens.

The forward panel is preferably fabricated of an acrylic resin and the rearward panel is preferably fabricated of an acrylonitrile-butadiene-styrene or polycarbonate resin. The forward and rearward panels are preferable about 0.045 inch thick.

DESCRIPTION OF A PREFERRED EMBODIMENT

Figure 1:
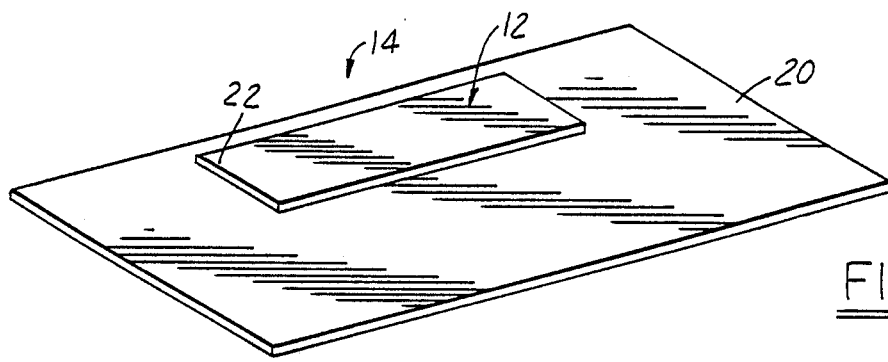
FIG. 1 is a view in perspective of the rearward surface of the forward panel forming a preferred embodiment of the lens structure in accordance with the present invention.
Figure 2:
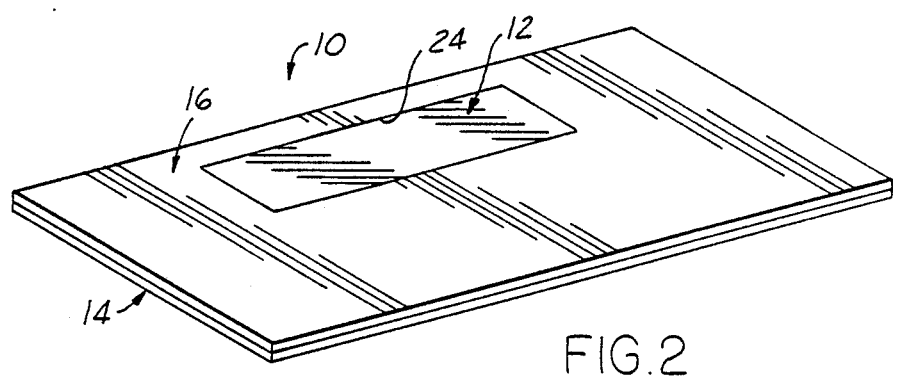
FIG. 2 is a view in perspective of the lens structure of the present invention after the rearward panel has been heat fused to the forward panel.
Figure 3:
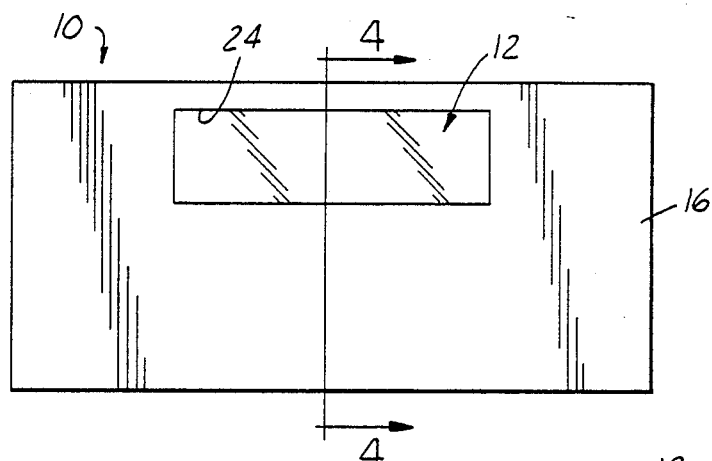
FIG. 3 is an elevational view of the forward surface of the lens structure of FIG. 2.
Figure 4:
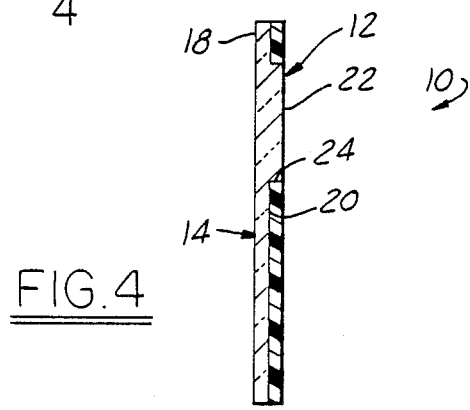
FIG. 4 is a sectional view taken substantially along the line 4—4 of FIG. 3 looking in the direction of the arrows.

Referring to the figures, it will be noted that the lens structure 10 is generally rectangular. The lens structure 10, in use, is positioned in front of a car radio to permit viewing by the car occupants of information generated by the radio. This information is of the usual type, consisting ordinarily of the time of day, the station to which the radio is tuned or other information as desired. The lens structure may be used for similar vehicle electronic structure such as trip odometers or the like. A clear, transparent rectangular portion 12 is provided centrally of the lens structure 10 and forms a lens for viewing the information above mentioned. This information is generated by, for example, a vacuum fluorescent display. The field surrounding the lens 12 is desirably opaque. Currently the preferred color is black.

The lens structure 10 is composed of two layers or panels 14, 16. The panel 14 is characterized as a forward panel inasmuch as it is furtherest in front of the radio. The panel 16, being behind the panel 14, is characterized as a rearward panel.

The forward panel 14 includes a forward surface 18 and a rearward surface 20. A generally rectangular lens portion 22 is provided on the rearward surface 20 and projects rearwardly therefrom. The lens portion 22 forms, with the contiguous forward portion of the forward panel 14, that is the portion of the panel immediately forward of the lens portion 22, the lens 12.

The forward panel 14 is fabricated of a transparent thermoplastic resin, preferably an acrylic resin. Acrylic resins have the desired properties of being glassy and transparent and are relatively hard so as to resist scratching.

The rearward panel 16 has a rectangular opening 24 which receives the lens portion 22. The rearward panel 16 is fabricated of an opaque thermoplastic resin, preferably acrylonitrile-butadiene-styrene or polycarbonate. This resin is pigmented so as to result in the panel 16 being opaque. The preferable pigmentation is black.

The lens structure 10 is preferably fabricated by an injection molding process involving the use of elevated temperatures. First, the forward panel 14 is molded. Then the rearward panel 16 is molded directly onto the rearward surface 20 of the forward panel 14. It is necessary that both the forward panel and rearward panel be fabricated of a thermoplastic resin in order that the rearward panel 16 will heat fuse to the portion of the rearward surface 20 of the forward panel adjacent to, but not including, the rearward surface of the lens portion 22 (although heat fusing will take place along the side edges of the lens portion 22). The panels 14, 16 may be fabricated in a two-step process in a two color molding machine. Alternately, the fabrication process could take place using two separate molds.

Preferably, the panels 14, 16 are each of substantial thickness. For example, these panels may be about 0.045 inch thick. This thickness level is important not only from a structural standpoint but also to prevent observable scratches, particularly with reference to the rearward panel 16. The lens portion 22 may also be 0.045 inch thick so that it will match the thickness of the rearward panel 16.

We claim:

1. A lens structure for a vehicle radio or the like to permit display of information generated by the radio, the lens structure comprising: a forward panel, said forward panel being injection molded of a clear thermoplastic resin and including a forward surface and a rearward surface; a lens portion of said rearward surface projecting rearwardly therefrom, the lens portion forming, with a contiguous forward portion of the forward panel, a lens; and a rearward panel, said rearward panel being injection molded of an opaque thermoplastic resin onto the forward panel and heat fused to the portion of the rearward surface of the forward panel adjacent to, but not including, a rearward surface of said lens.

2. A lens structure as defined in claim 1, wherein the forward panel is fabricated of an acrylic resin.

3. A lens structure as defined in claim 1, wherein the rearward panel is fabricated of one of an acrylonitile-butadiene-styrene and polycarbonate resin.

4. A lens structure as defined in claim 1, wherein each of the forward and rearward panels is about 0.045 inch thick.

* * * * *